Dec. 1, 1964 G. F. DABLE 3,159,047
SEGMENTED GEAR
Filed Sept. 21, 1962
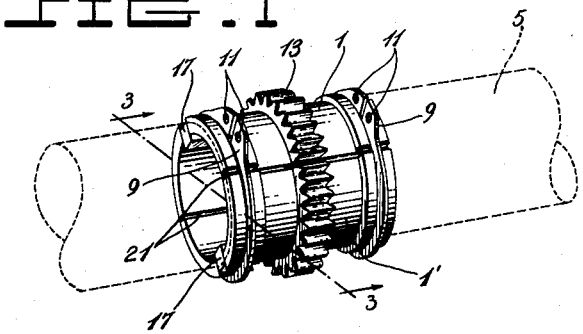
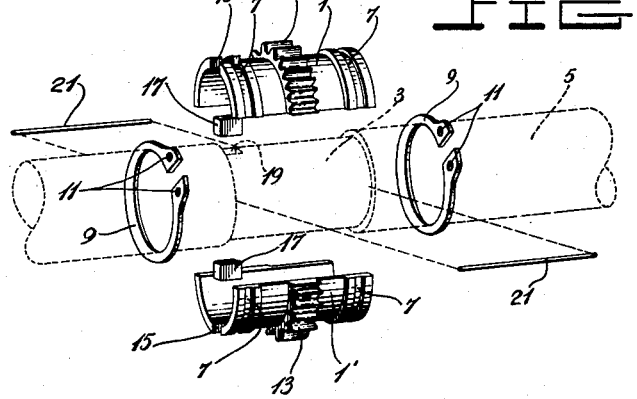
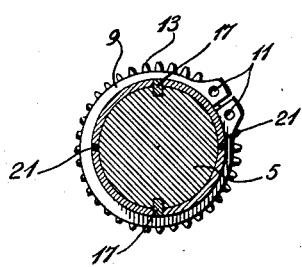
INVENTOR
George F. DABLE
BY
ATTORNEYS

United States Patent Office 3,159,047
Patented Dec. 1, 1964

3,159,047
SEGMENTED GEAR
George F. Dable, 174 Des Erables, Drummondville-West, Quebec, Canada
Filed Sept. 21, 1962, Ser. No. 225,210
2 Claims. (Cl. 74—450)

The instant application relates to a small gear, segmented into two arcuate parts so that it can easily and rapidly be mounted and removed from a shaft or the like cylindrical members.

One of the main advantages of a gear of the above mentioned type is that it can easily and rapidly be replaced without having to shut down the machinery for any extended length of time, because it is not necessary to remove any or all parts of the bearings in which the shaft is journaled.

In gears of the above type, it has been found advantageous, in order to prevent axial displacement, to house the gear in an annular recess cut around the shaft. This expedient also saves space, which is an important consideration where the machinery has to be made as compact as possible. Obviously, such a gear cannot be slipped on the shaft and it is therefore customary to cut it into two halves which are inserted in the recess in saddle fashion; the metal of the shaft being then peened or hammered to lock each half or section into position. However, such peening or hammering operation induces fatigue with the result that the gear can only be replaced a few times before the shaft has to be replaced. It is well-known that such shafts, particularly in textile machinery, are expensive and their replacement after such a short use is rather serious, considering that it would not have been necessary, had it not been for the aforesaid induced fatigue, resulting from the peening or hammering operation.

It is therefore a main object of the invention to provide a segmented gear which will do away with the above noted disadvantage, that is: do away with the peening or hammering when being installed.

Another object of the invention lies in the provision of a segmented gear that can be put on a shaft rapidly and easily without necessity of overdue down time on the machinery.

Still another object of the invention resides in the provision of a segmented gear of the above type which can be manufactured at a low cost, yet is a sturdy and durable article.

The invention has been found particularly advantageous to minimize the down time attributable to maintenance of spinning frames. On these machines there are virtually hundreds of such gears used for driving the equally numerous knurled rolls thereof. With the present invention the replacement of a gear on any of the knurled rolls may only take a fraction of a minute whereas with the above mentioned conventional split or segmented gears, and under the best possible conditions it used to take several minutes.

The above advantages are made possible with a segmented gear made according to the invention which comprises: two complementary semi-cylindrical sections adapted to be freely received on a shaft and at least one retaining ring mounted over the sections to hold them together on the shaft. The said retaining rings are preferably received in grooves which are formed on each section so as to be in alignment with one another to form one or several circular channels on the surface of the segmented gear. The retaining rings are preferably flexible and split so that they may easily be mounted on the gear, usually with the help of special pliers.

A better understanding of the invention will be afforded by the description that follows having regard to the annexed drawings wherein:

FIGURE 1 is a view in perspective of a segmented gear made according to the invention and shown mounted on a shaft, illustrated in dotted lines;

FIGURE 2 is an exploded view of the segmented gear of FIGURE 1;

FIGURE 3 is a cross-sectional view taken along line 3—3 of FIGURE 1.

As shown, the segmented gear of the invention comprises two semi-cylindrical sections 1, 1' adapted to be normally received, in a recess 3, of equal width, on a shaft 5.

Each section 1 or 1' is formed with at least one groove 7, preferably one at each end thereof, for the reception of retaining rings 9. The retaining rings 9 are split flexible rings usually made of high strength spring steel and are provided with holes 11 on each facing end for the reception of the opening pins of suitable opening pliers (not shown).

As is best illustrated in FIGURE 1, the grooves 7 of one section are arranged to correspond and be in alignment with grooves 7 of the other semi-cylindrical section.

A toothed segment 13 is normally located centrally of each section 1, 1' and, similarly to grooves 7, are in alignment with one another when received on shaft 5.

Each section 1, 1' is provided with at least one key slot or hole 15 cut out through each section and also across one of the channels 7. These slots or holes serve for the reception of a key 17 engageable in a recess or perforation 19 on the surface of the shaft 5 within the recess 3.

As the segmented gear comes out of a cylindrical member which is later cut into two parts by means of a saw or guarding disc, acting axially of the cylindrical member, elongated filler rods 21 have to be provided between the two sections to prevent loose play of the segments on shaft 5, and to maintain the regular spacing of the gear when passing from one segment to the other.

The filler rods are of a thickness such as to fully compensate for the material lost during the cutting operation of the starting fully circular gear. The length of the filler rods is preferably equal to that of the recessed portion 3 so that there can be longitudinal play.

The function of the retaining rings is threefold: (a) they retain the segments 1 and 1' in position; (b) they hold down the keys 17, and (c) they hold the filler rod 21 in place. Briefly, the retaining rings act as locking elements for the system of gear segments, keys and filler rods.

In assembled condition of FIGURE 1, the two sections 1, 1' are mounted over shaft 5 in the recess 3 so that axial displacement thereof in relation to the shaft is prevented. Keys 17 are dropped through slots 15 and recesses 19 so that the sections are prevented from rotating in relation to the shaft. Rings 9, being located in the recesses 7, hold the two sections together and also the keys 17 in the slots 15 and recesses 19.

Although a specific embodiment of the invention has just been described, it will be understood that various modifications may be made thereto without departing from the spirit of the invention, or the scope thereof as defined in the appended claims.

1. A segmented gear-to-shaft assembly comprising:
   (a) a shaft;
   (b) two complementary sleeve-like semi-cylindrical sections resulting from the sawing off of a cylindrical member along an axial plane thereof;
   (c) said sections adapted to be mounted on said shaft;
   (d) a gear segment on the outer surface of each section;

(e) said segments being in circumferential alignment with each other;
(f) each section being formed with a peripheral circumferential groove; said grooves being in alignment with one another to define a circular channel extending fully around the outer surface of said sections;
(g) said shaft being formed with a key recess opening through the outer surface thereof;
(h) at least one of said sections being formed with a key slot through the wall thereof and extending axially from one end of the section and cutting across said channel;
(i) a key in said key slot and key recess, and
(j) a split ring removably mounted in said channel over said key to retain said sections in non-rotational engagement on said shaft during driving thereof.

2. A segmented gear as claimed in claim 1, further comprising elongated filler rods disposed between facing radial edges of said complementary sections.

References Cited in the file of this patent
UNITED STATES PATENTS

| | | |
|---|---|---|
| 843,202 | Frank | Feb. 5, 1907 |
| 1,352,761 | St. John et al. | Sept. 14, 1920 |